United States Patent
Luo et al.

(10) Patent No.: US 6,531,593 B1
(45) Date of Patent: Mar. 11, 2003

(54) METHOD FOR PRODUCTION OF CELLULOSE DERIVATIVES AND THE RESULTING PRODUCTS

(75) Inventors: Mengkui Luo, Tacoma, WA (US); Richard A. Jewell, Bellevue, WA (US); Amar N. Neogi, Kenmore, WA (US)

(73) Assignee: Weyerhaeuser Company, Federal Way, WA (US)

( * ) Notice: Subject to any disclaimer, the term of this patent is extended or adjusted under 35 U.S.C. 154(b) by 0 days.

(21) Appl. No.: 09/571,795

(22) Filed: May 16, 2000

Related U.S. Application Data

(60) Provisional application No. 60/135,255, filed on May 21, 1999.

(51) Int. Cl.$^7$ .................. C08B 11/00; C08B 11/20; C08B 11/193
(52) U.S. Cl. .................. 536/87; 536/84; 536/90; 536/91; 536/30
(58) Field of Search ............... 536/84, 85, 90, 536/91, 88, 87, 57; 260/231, 17 CM; 128/296; 428/216, 195, 330, 331, 518, 507, 521, 520

(56) References Cited

U.S. PATENT DOCUMENTS 3,589,364 A * 6/1971 Dean et al. .............. 604/368
4,066,828 A * 1/1978 Holst et al. .............. 536/87
4,075,279 A * 2/1978 Holst et al. .............. 536/88
5,212,008 A * 5/1993 Malhotra et al. .......... 428/195

FOREIGN PATENT DOCUMENTS

EP 0410480 A2 * 7/1990 ........... A61L/15/18

OTHER PUBLICATIONS

Anbergen, U and W. Opperman. Elasticity and Swelling behaviour of chemically crosslinked cellulose ethers in aqueous systems. *Polymer*31: 1854–1858 (1990).

Suto, S. and K. Suzuki. Crosslinked hydroxypropl cellulose films retaining cholesteric liquid crystalline order: 2. Anisotropic swelling behaviour in water. *Polymer*38: 391–396 (1997).

* cited by examiner

*Primary Examiner*—Jeffrey Fredman
*Assistant Examiner*—Christine Maapin

(57) ABSTRACT

Cellulose derivatives are formed by first crosslinking cellulose and subsequently reacting the crosslinked cellulose with a reagent capable of forming a cellulose ether or ester. Many crosslinking agents are suitable but those forming ether linkages between cellulose chains are preferred. The crosslinking, in effect, increases the D.P of the cellulose so that wood celluloses are then suitable for forming compositions that previously could only be formed very high D.P celluloses; e.g., those derived from cotton linters.

13 Claims, 2 Drawing Sheets

METHOD FOR PRODUCTION OF CELLULOSE DERIVATIVES AND THE RESULTING PRODUCTS

This application claims priority from Provisional Application Serial No. 60/135,255, filed May 21, 1999.

The present invention is directed to a method of producing cellulose derivatives using cellulose modified by crosslinking and to the resulting products. The method is particularly directed to the use of wood celluloses that might not otherwise be suitable for production of the particular derivative.

BACKGROUND OF THE INVENTION

Cellulose derivatives have been commercially available since the advent of camphor plasticized nitrocellulose as the first synthetic plastic material in 1868. About the time of the first World War cellulose acetate began to be used as a nonflammable aircraft lacquer. It was not until the decade of the 1940s that cellulose ethers became commercially important. Water soluble methyl cellulose was introduced in 1939 and ethyl cellulose became important during World War II. Sodium carboxymethyl cellulose (NaCMC) became available shortly after the war and today is one of the most widely used cellulose derivatives. Many other cellulose ethers are produced as specialty chemicals.

For many years purified cotton linters was the major raw material for production of cellulose esters and ethers. However, for some products high alpha cellulose sulfite or prehydrolyzed kraft wood pulps have also been used. If NaCMC may be used as an example, it is available in various viscosity grades. The term "viscosity" here refers to viscosity of a water solution. In turn, solution viscosity is closely related to degree of polymerization (D.P.) of the cellulose raw material. High viscosity grades have traditionally been produced from cotton linters cellulose while medium and low viscosity grades are made using lower cost wood pulps. The D.P. of most wood pulps does not exceed about 1500 although some specialty dissolving pulps have considerably higher D.P. Cotton linters cellulose can be readily produced with a D.P. of 2400 or greater.

Because of their cost advantage, it would be advantageous to the manufacturers of various cellulose derivatives if wood pulps could be used more extensively. Although not limited to wood derived cellulose sources, the present invention serves that end by increasing the effective D.P. of celluloses to make them suitable raw materials for derivatives requiring a high D.P starting material.

SUMMARY OF THE INVENTION

The present invention relates to preparation of cellulose derivatives using crosslinked cellulose as a basic raw material. By introducing a controlled amount of crosslinking, the effective D.P. of the cellulose may be significantly raised without destroying cellulose reactivity. In turn, the crosslinked product may be used for preparation of derivatives that formerly required very high D.P., and usually very high priced, cellulose sources as a starting raw material.

The preferred cellulose is a wood pulp cellulose of the type normally referred to as a "dissolving pulp" or "high alpha chemical pulp". These are cellulosic materials normally prepared by the sulfite or prehydrolyzed kraft processes. Other cellulose sources having sufficient reactivity with etherification or esterification chemicals after crosslinking are also considered suitable. Among these are paper grade sulfite pulps, the paper or fluff grades of kraft pulps nominally called "kraft market pulps", cotton linters cellulose, and cellulose obtained from other plant or bacterial sources.

The term cellulose derivatives should be read broadly and is intended to include both esters, such as nitrocellulose and cellulose acetate, and ethers such as methyl cellulose, ethyl cellulose, carboxymethyl cellulose, carboxyethyl cellulose, carboxypropyl cellulose, hydroxyethyl cellulose, carboxymethylhydroxyethyl cellulose, and many others.

Crosslinked celluloses of various types are well known; e.g., see G. C. Tesoro, Cross-linking of cellulosics, In *Handbook of Fiber Science and Technology*, Vol. II, M. Lewin and S. B. Sello eds., pp. 1–46, Marcel Decker, New York (1993), as exemplary. Crosslinking forms chemical or ionic bridges between hydroxyl groups on adjacent cellulose molecules. Commercially, crosslinking is important in cotton fabric finishes to provide wrinkle resistance. Crosslinked wood pulp fibers are also used in other consumer articles such as disposable diapers or paper towels where their relative stiffness serves to increase bulk and compression resistance. However, to the present inventors' knowledge, crosslinked cellulose has never before been used as a raw material for production of cellulose derivatives.

While many crosslinking agents are believed to be suitable in the present process, those that produce compounds resistant to D.P. loss during derivitization are preferred. In particular, those that form ether linkages with the cellulose are particularly preferred. Agents that produce hemiacetal linkages have also been found to be suitable.

It is an object of the present invention to provide a method for production of various cellulose derivatives using crosslinked cellulose.

It is a further object to provide high effective D.P. wood pulps as a raw material for derivitization.

It is another object to provide cellulose derivatives made using wood pulps which have the D.P. characteristics of cotton celluloses.

It is yet an object to provide cellulose derivatives having entirely new properties heretofore unattainable.

It is also an object to produce a high viscosity grade of NaCMC from a modified low cost wood pulp cellulose.

These and many other objects will become readily apparent upon reading the following detailed description taken in conjunction with the drawings.

DETAILED DESCRIPTION OF THE PREFERRED EMBODIMENTS

Figure 1:
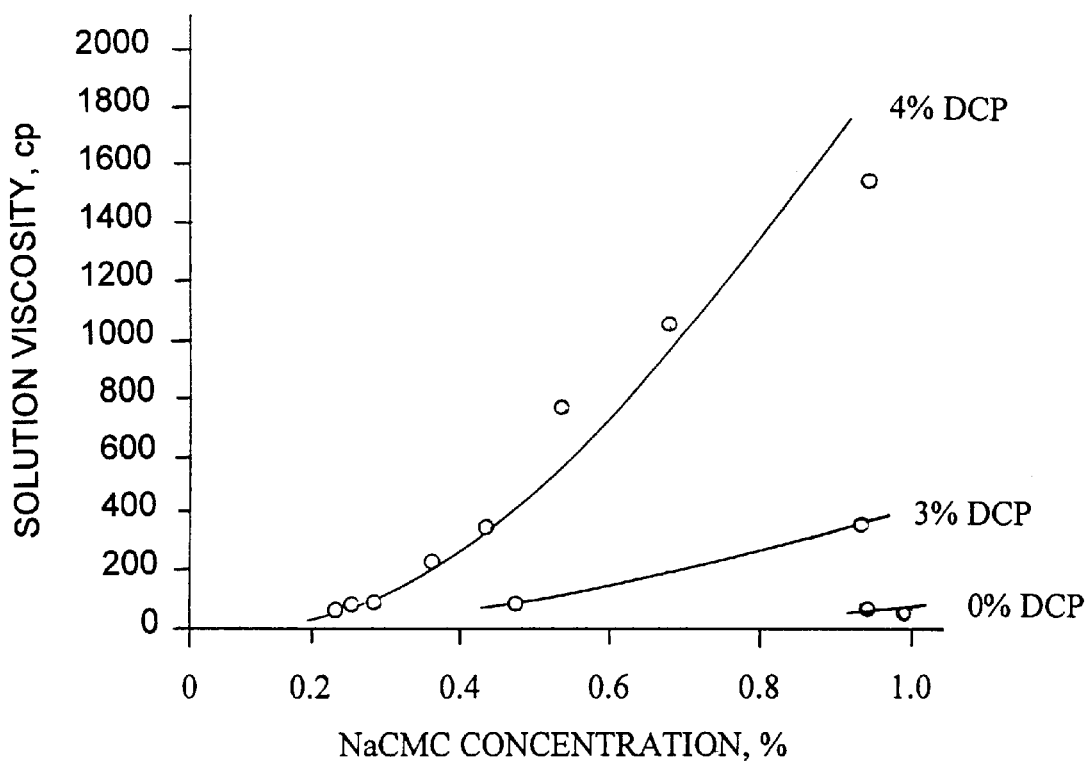
FIG. 1. shows viscosities of CMC made from wood cellulose having varying degrees of crosslinking.

Certain crosslinked cellulose derivatives that have been crosslinked after their derivitization are reported in the literature. U. Anbergen and W. Opperman, *Polymer* 31: 1854–1858 (1990), report swelling properties of carboxymethyl cellulose and hydroxyethyl cellulose crosslinked with divinylsulfone in alkaline solution. Their compounds were investigated as possible superabsorbent polymers. S. Suto and K. Suzuki report swelling behavior of hydroxypropyl cellulose crosslinked with either glyoxal or glutaraldehyde, *Polymer* 38: 391–396 (1997). However, the polymers were originally prepared conventionally and crosslinking was done after etherification of the cellulose.

The following examples will serve to disclose the best mode presently known of practicing the present invention.

EXAMPLE 1

Preparation of DCP Crosslinked Cellulose 1,3-dichloro-2-propanol (DCP) is a known cellulose crosslinking agent. A sample of never dried T758 wood pulp was obtained as an 18.2% solids wet lap from a Weyerhaeuser Company mill at Cosmopolis, Wash. This is a sulfite etherification grade pulp with a D.P. of 2150 and an a-cellulose content of 95.3%. A 120 g (dry weight basis) sample was added to water to produce 1200 g of a 10% consistency slurry. To this slurry was added 24 g of 10% NaOH solution. Stirring was continued for 0.5 hr at room temperature. At that time 24 g of a 10% DCP solution in water was added. Stirring was continued for 15 minutes at room temperature and then for 2 hr at 60° C. The resulting crosslinked pulp was thoroughly water washed and then dried. D.P. of the crosslinked material was determined by its cupriethylenediamine (cuene) viscosity using ASTM method D 1975-62 to be about 2873.

EXAMPLE 2

Preparation of CMC from Crosslinked Pulp

Within the context of the present description the terms CMC and NaCMC should be considered synonymous. A 5 g sample of the crosslinked pulp of Example 1 was slurried in 133 mL isopropanol. To this was added 13.3 mL of 30% NaOH solution over a 30 minute period. This suspension was then stirred for 1 hr at 25° C. At that time 6 g of monochloroacetic acid was added (as 25.4 mL of a solution of 23.6 g MCA/100 mL isopropanol) over a 30 minute period. The temperature was raised to 55° C. and stirring continued for 3.5 hr. The resulting fibrous NaCMC was drained and washed with 70% methanol. The sample was brought to neutrality (pH 7.0) with acetic acid and again washed, first with 70% and then 100% methanol at 60° C. until essentially salt free.

EXAMPLE 3

In the following experiments two additional pulp grades from the above pulp mill were used. MAC is a sulfite pulp intended for cellulose acetate production and PH is a paper grade sulfite pulp. These were crosslinked in similar fashion to the sample of Example 1 although the amount of crosslinker and NaOH concentration were varied as is seen in the following table.

TABLE 1

| Pulp | DCP, % | NaOH, % | D.P. |
|---|---|---|---|
| MAC | — | — | 1585 |
| MAC | 0 | 10 | 1867 |
| MAC | 10 | 10 | Insoluble |
| MAC | 10 | 10 | Insoluble |
| PH | — | — | 1461 |
| PH | 0.1 | 0.1 | 1461 |
| PH | 0 | 3.0 | 1474 |
| PH | 1.0 | 1.0 | 1547 |
| PH | 1.0 | 1.0 | 1551 |
| PH | 1.5 | 1.5 | 1571 |
| PH | 2.0 | 2.0 | 1703 |
| PH | 3.0 | 3.0 | 1874 |
| PH | 4.0 | 4.0 | 1562* |

*Sample not completely soluble in cuene. Indicated D.P. questionable.

It might be noted that the NaOH solution used above also extracted some residual hemicellulose and short chain cellulose and increased D.P for both grades. The extraction effect was significant at 10% NaOH concentration but of minor consequence at 3–4% NaOH usage.

EXAMPLE 4

The crosslinked PH pulps of Example 3 made with 0%, 3%, and 4% DCP were used to make CMC according to the procedure of Example 2. The resulting NaCMC products were dissolved in water at percentages of 0.2 to 1.0. The resulting 15 solution viscosities measured and are shown in FIG. 1. It is noteworthy that the NaCMC made with 4% DCP had a solution viscosity about 15 times greater than that of CMC made with uncrosslinked pulp.

EXAMPLE 5

Two samples of crosslinked grade T758 sulfite pulp were made in which 1.5% epichlorohydrin, based on dry pulp, was used as the crosslinking agent. The procedure was generally that of Example 1 with the following variations. One sample was prepared without any NaOH addition while the other had 1.5% NaOH. Since epichlorohydrin is essentially insoluble in water, a water suspension was made using high shear agitation prior to addition to the pulp slurry in water. In each case a 10% epichlorohydrin suspension was prepared and 18 g of the epichlorohydrin suspension was added.

NaCMC was prepared from the above samples according to the procedure of Example 2. A comparison sample was also made using grade T758 pulp crosslinked with 1.5% DCP, and 1.5% NaOH based on cellulose. A fourth NaCMC preparation was made as a control sample using an uncrosslinked etherification grade pulp from Borregaard, Sweden. This pulp has a D.P. of 2360 and α-cellulose content of 91.6%.

Figure 2:
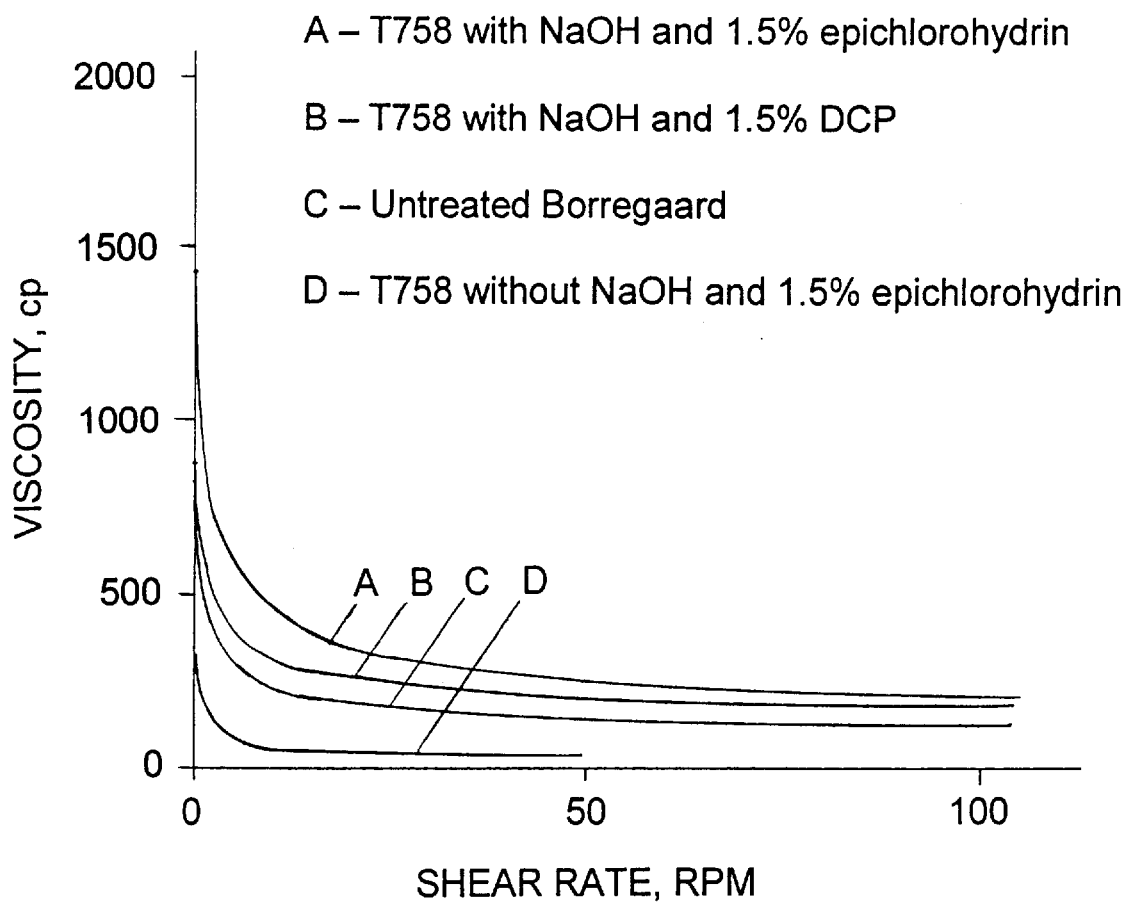
FIG. 2 shows rheological properties of four CMC samples

It is well known that CMC exhibits more or less thixotropy in aqueous solution. Samples of the four CMC products made above were made as 0.25% aqueous solutions. Viscosity was measured using a Brookfield viscometer with a #2 spindle at various spindle speeds. Rheological properties of these samples are shown as curves plotted on FIG. 2.

EXAMPLE 6

A sample of grade T758 cellulose was crosslinked with glyoxal generally according to the procedure of Example 1 with the following differences. Instead of DCP, 24 g of a 10% solution of glyoxal in water was used. In addition, 2.4 g of $Al_2(SO_4)_3$ was added as a catalyst. The crosslinking reaction was carried out for 3 hr at 85° C.

NaCMC was made from the glyoxal crosslinked cellulose according to the procedure outlined in Example 2. A control sample of CMC was also made from the uncrosslinked T758 cellulose. Both CMC samples were dissolved in water to form a 1% solution and viscosities were measured at varying shear rates as in Example 3. Results are shown in the following Table.

TABLE 2

| Shear Rate, rpm | 50 | 20 | 10 | 5 | 2.5 | 1.0 | 0.5 |
|---|---|---|---|---|---|---|---|
| Glyoxal Crosslinked, Viscosity, cp | 488 | 592 | 628 | 648 | 656 | 878 | 880 |
| Untreated, Viscosity, cp | 64 | 64 | 64 | 64 | 70 | 80 | 80 |

In addition to carboxymethyl cellulose, the crosslinked cellulose intermediate is also advantageous for preparation of hydroxyethyl or hydroxypropyl cellulose by reaction respectively with ethylene oxide in an alkaline environment under conditions extensively reported in the literature. Similarly, methyl cellulose may be prepared by reaction of the crosslinked intermediate with methyl chloride and ethyl cellulose by reaction with ethyl chloride, again under alkaline conditions.

Crosslinked cellulose is also useful for preparation of cellulose esters, especially cellulose acetate, by reacting the crosslinked intermediate with acetic anhydride under known conditions. In this case, it is preferable to use relatively a lower D.P. cellulose; e.g. D.P. ~1400, as a starting material to reduce tendency to gel formation that might interfere with filterability.

In addition to the cellulose crosslinking agents noted above in the examples, many others are believed to be suitable for making crosslinked cellulose suitable for derivatizing. Among these are urea formaldehyde and melamine formaldehyde condensates, dimethyloldihydroxyethylene urea (DMDHEU), dimethyldihydroxyethylene urea (DMeDHEU), citric acid, methylene-bis-acrylamide, and dicarboxylic acids such as succinic acid, and polyamide-epichlorohydrin (PAE) resins, to name several exemplary compounds.

While the inventors have exemplified the best mode known at the time of filing, it will be apparent to those skilled in the art that many variations in the methods described and products produced can be made without departing from the spirit of the invention. It is the intent of the inventors that these methods and products should be included within the scope of the invention if encompassed within the following claims.

We claim:

1. A method of making a water soluble cellulose derivative which comprises:

forming a crosslinked fibrous wood cellulose that remains soluble in cupriethylenediamine following crosslinking;

reacting the crosslinked cellulose with a sufficient amount of an etherifying reagent to form a water soluble cellulose ether; and recovering the cellulose ether from the reaction mixture.

2. The method of claim 1 in which the cellulose is crosslinked with a material selected from the group consisting of 1,3-dichloro-2-propanol, epichlorohydrin, dicarboxylic acids, and polyamide-epichlorohydrin resins.

3. The method of claim 2 in which the cellulose is crosslinked with 1,3-dichloro-2-propanol.

4. The method of claim 2 in which the cellulose is crosslinked with epichlorohydrin.

5. The method of claim 1 in which the cellulose ethers formed are selected from the group consisting of carboxymethyl cellulose, hydroxyethyl cellulose, hydroxypropyl cellulose, methyl cellulose, and ethyl cellulose.

6. The method of claim 5 in which the etherifying agent is monochloroacetic acid and the cellulose ether formed is carboxymethyl cellulose.

7. The method of claim 5 in which the etherifying agent is ethylene oxide and the cellulose ether formed is hydroxyethyl cellulose.

8. The method of claim 5 in which the etherifying agent is propylene oxide and the cellulose ether formed is hydroxypropyl cellulose.

9. The method of claim 5 in which the etherifying agent is methyl chloride and the cellulose ether formed is methyl cellulose.

10. The method of claim 1 in which the cellulose is a wood fiber cellulose.

11. Water soluble cellulose ethers prepared by etherification of previously crosslinked cellulose, the crosslinked cellulose before etherification remaining soluble in cupriethylenediamine.

12. The cellulose ethers of claim 11 that are selected from the group consisting of carboxymethyl cellulose, hydroxyethyl cellulose, hydroxypropyl cellulose, and methyl cellulose.

13. The cellulose ethers of claim 12 in which the cellulose is a wood fiber cellulose.

* * * * *